(12) United States Patent
Ersoy et al.

(10) Patent No.: US 7,121,757 B2
(45) Date of Patent: Oct. 17, 2006

(54) PROCESS AND DEVICE FOR MOUNTING BALL AND SOCKET JOINTS WITH AT LEAST ONE CONNECTING PIECE

(75) Inventors: Metin Ersoy, Walluf (DE); Volker Grube, Diepholz (DE); Frank Nachbar, Lemförde (DE); Uwe Zeibig, Achern (DE)

(73) Assignee: ZF Lemförder Metallwaren AG, (DE)

( * ) Notice: Subject to any disclaimer, the term of this patent is extended or adjusted under 35 U.S.C. 154(b) by 0 days.

(21) Appl. No.: 10/480,397

(22) PCT Filed: Feb. 10, 2003

(86) PCT No.: PCT/DE03/00360

§ 371 (c)(1),
(2), (4) Date: Dec. 8, 2003

(87) PCT Pub. No.: WO03/069171

PCT Pub. Date: Aug. 21, 2003

(65) Prior Publication Data

US 2004/0170470 A1    Sep. 2, 2004

(30) Foreign Application Priority Data

Feb. 15, 2002 (DE) .............................. 102 06 622

(51) Int. Cl.
*F16C 11/00* (2006.01)
(52) U.S. Cl. .............. 403/141; 403/122; 403/134; 403/135; 403/142; 403/143
(58) Field of Classification Search .............. 403/76, 403/122, 134, 135, 141–143
See application file for complete search history.

(56) References Cited

U.S. PATENT DOCUMENTS

| 2,928,687 | A |   | 3/1960  | Latzen                        |
|-----------|---|---|---------|-------------------------------|
| 2,933,336 | A | * | 4/1960  | Pritchard et al. ..... 403/143 |
| 2,954,993 | A | * | 10/1960 | Scheublein, Jr. et al. ..... 403/36 |
| 3,101,961 | A | * | 8/1963  | White ..... 403/52             |
| 3,110,505 | A | * | 11/1963 | Gladden ..... 403/143          |
| 3,202,444 | A | * | 8/1965  | Rowlett ..... 403/143          |
| 3,337,246 | A | * | 8/1967  | Moskovitz ..... 403/135        |
| 3,846,032 | A |   | 11/1974 | Harada et al.                 |
| 3,861,812 | A | * | 1/1975  | Ito ..... 403/71               |
| 3,999,872 | A |   | 12/1976 | Allison                       |
| 4,290,181 | A |   | 9/1981  | Jackson                       |
| 4,916,788 | A |   | 4/1990  | Mitoya                        |
| 5,882,137 | A |   | 3/1999  | Epp et al.                    |

FOREIGN PATENT DOCUMENTS

DE            899 170         10/1953

(Continued)

*Primary Examiner*—Daniel P. Stodola
*Assistant Examiner*—Michael P. Ferguson
(74) *Attorney, Agent, or Firm*—McGlew & Tuttle, PC

(57) ABSTRACT

A process and a device are provided for mounting ball and socket joints with at least one connecting piece. A first ball and socket joint housing part (3a) is fed to a mounting device, a ball pivot (1), surrounded by a bearing shell (2), is inserted into the first ball and socket joint housing (3a). A second housing part (3b) closing the ball and socket joint is positioned at the first ball and socket joint housing part (3a). A connecting piece (4) is placed at the ball and socket joint housing (3a, 3b), and the housing parts (3a, 3b) are joined together and to the connecting piece (4) in a non-positive and positive-locking manner and/or connected via a corresponding connection (5).

10 Claims, 5 Drawing Sheets

FOREIGN PATENT DOCUMENTS

| | | |
|---|---|---|
| DE | 26 30 083 | 3/1979 |
| DE | 38 26 987 | 2/1989 |
| DE | 196 25 351 | 11/1997 |
| FR | 2 588 623 | 4/1987 |

* cited by examiner

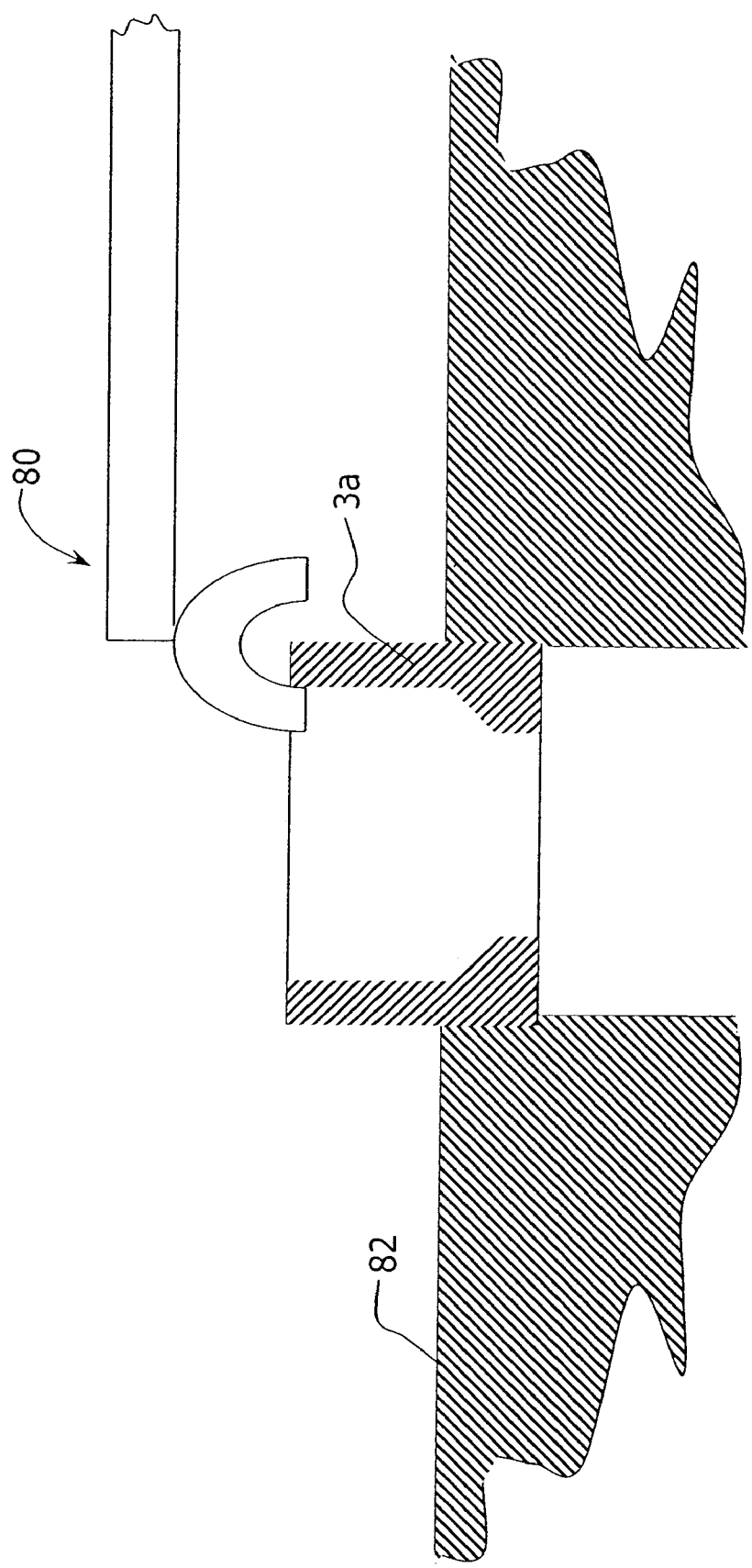

PROCESS AND DEVICE FOR MOUNTING BALL AND SOCKET JOINTS WITH AT LEAST ONE CONNECTING PIECE

FIELD OF THE INVENTION

The present invention pertains to a process and a device for mounting ball and socket joints with at least one connecting piece, wherein a first ball and socket joint housing part is fed into a mounting device, a ball pivot, surrounded by a bearing shell, is inserted into the first ball and socket joint housing, a second housing part closing the ball and socket joint is positioned at the first ball and socket joint housing part, the connecting piece is placed adjacent to the ball and socket joint housing, and the housing parts are joined together with one another and with the connecting piece in a non-positive and positive-locking manner and/or in substance via a corresponding connection.

BACKGROUND OF THE INVENTION

Such processes are usually used in manufacturing plants of outside vendors of the automobile industry, e.g., during the mounting of suspension arms. Only ball and socket joints may be considered for use for the articulated mounting of suspension arms in vehicles because of the forces and movements occurring. A ball and socket joint comprises here at least one one-part or multi-part ball and socket joint housing, a one-part or multipart bearing shell, and a ball pivot, wherein the ball pivot is mounted in the bearing shell, which is in turn surrounded by the housing. The ball pivot must be accommodated in the housing or in the bearing shell such that no movements are possible in the axial direction of the ball pivot. This is achieved in practice by an oversize of the ball pivot diameter in relation to the ball pivot opening of the ball and socket joint housing.

A process for manufacturing a ball and socket joint has been known from the German patent application DE 38 26 987. A bearing shell is prepared according to DE 38 26 987 by original shaping around a ball pivot introduced into a housing designed as a mold and the housing is subsequently closed by means of a deformation process. This is followed in practice by the joining with a connecting piece in a separate step. A connecting piece is defined in the sense of the present invention especially as a suspension arm of a motor vehicle.

The drawback arising in the prior-art process is that time, e.g., set-up time, and costs, e.g., transportation costs, are needlessly involved due to a plurality of steps. Furthermore, close tolerances must be maintained, because the different manufacturing processes are not coordinated due to the separate manufacturing sites and it is therefore necessary to maintain the tolerance of the most accurate manufacturing process, even though a greater tolerance would suffice in other manufacturing processes.

SUMMARY OF THE INVENTION

The object of the present invention is therefore to provide a process for manufacturing and mounting ball and socket joints with connecting pieces, in which the mounting effort is reduced, and to provide a device with which this process can be carried out.

According to the invention, a process is provided for mounting ball and socket joints with at least one connecting piece. The process includes feeding a first ball and socket joint housing part to a mounting device. A ball pivot, surrounded by a bearing shell, is inserted into the first ball and socket joint housing part. A second housing part, surrounding the ball and socket joint, is positioned at the first ball and socket joint housing part. A connecting piece is placed at the ball and socket joint housing part. The housing parts are joined together and to the connecting piece in a non-positive and positive-locking manner and/or in substance via a corresponding connection.

According to another aspect of the invention, a device is provided for mounting ball and socket joints with at least one connecting piece. At least one feed means is provided for feeding a first ball and socket joint housing part into a mounting means, which is used to insert at least one ball pivot and a bearing shell into the first ball and socket joint housing as well as to feed a second housing part closing the ball and socket joint. The feed means is designed to feed the connecting piece to the ball and socket joint housing. At least one joining means is present, which is suitable at least for joining the housing part fed in last with the connecting piece via a corresponding connection.

The present invention includes the technical featrure that the manufacture of ball and socket joints and the joining of the ball and socket joint and the connecting piece are integrated in one process step. To mount ball and socket joints and to connect them to at least one connecting piece, a first ball and socket joint housing part is fed according to the present invention into a mounting device, a ball pivot, surrounded by a bearing shell, is inserted into the first ball and socket joint housing part, and a second housing part closing the ball and socket joint is positioned at the first ball and socket joint housing part. A connecting piece is placed at the ball and socket joint housing, and the housing parts are joined with one another and with the connecting piece in a non-positive and positive-locking manner and/or in substance via a corresponding connection.

This solution offers the advantage that the mounting effort can be considerably reduced due to the integration of a plurality of steps of the manufacturing process in one step. Moreover, time, e.g., set-up time, transportation time, as well as material, e.g., packaging material, additional securing material for the transportation, can be saved due to the integration of the steps. Due to the coordination of a plurality of manufacturing steps, the tolerances of individual components can be made greater, as a result of which the components can be manufactured at a lower cost and in a more robust form.

Provisions are made according to a measure improving the present invention for the ball and socket joint and the connecting piece to be joined together by means of a welding process, because an inexpensive connection, which can be prepared in a simple manner, can thus be prepared. In addition, the joining operation can be adapted to different materials because of the large number of welding methods.

Provisions are made in another measure improving the present invention for the joining of the parts to be performed by laser welding, as a result of which a simple, inexpensive, rapid manufacture, which can be readily automated, is achieved. Slight thermal warping can be expected during laser welding because of the comparatively small amount of heat introduced into the parts, so that close tolerances can be maintained.

The joining of the individual parts may be advantageously performed by spot welding. As a result, a rapid and extremely inexpensive connection can thus be prepared, and this operation can be, moreover, readily automated.

It is also conceivable to bring about the joining of the individual parts by means of a circumferential weld seam if higher requirements are imposed on the connection.

As an advantageous variant, the ball and socket joint and the connecting piece may also be joined together by soldering or a bonded connection. These joining methods are inexpensive alternatives to welding if welding methods cannot be employed because of the material.

The connecting piece is preferably a suspension arm housing of a suspension arm of a motor vehicle. However, it is also conceivable that other components are used as the connecting piece of the ball and socket joint.

It is particularly advantageous for the individual parts to be designed corresponding to the process. It is thus possible to join all individual parts in a single joining step, which leads to an enormous advantage in terms of time.

Another advantage is that the housing parts can be manufactured by means of a deformation process, because the housing parts can thus be manufactured without additional processing steps if a suitable deformation process, e.g., deep-drawing, is selected.

The housing parts are preferably connected to one another and to the connecting piece in a non-positive and positive-locking manner and/or in substance without or via a connecting element, the connecting element being arranged such that the ball and socket joint housing forms a connected unit together with the connecting piece. The connecting piece is arranged essentially at the level of the parting line between the ball and socket joint housings. The connection may connect both two parts each, e.g., the two ball and socket joint housing parts to each other and the ball and socket joint housing and the connecting piece to each other, or even a plurality of parts, i.e., e.g., two ball and socket joint housing parts and the connecting piece to one another, into one unit. The connection may be either detachable, e.g., via a corresponding screw or clamp connection, or nondetachable, e.g., via a welded, soldered or bonded connection. It is also possible to use different types of connection together. For example, the two ball and socket joint housing parts may be connected to one another by a type of connection different from the type of connection used, e.g., to connect the two ball and socket joint housing to the connecting piece. In case of a connection in substance, the connecting element is preferably a weld seam, which may be prepared either by spot welding or circumferentially.

The ball and socket joint may be advantageously designed such that the second ball and socket joint housing part has an outer, front-side support surface, on which lies an outer, front-side support surface of the first ball and socket joint housing part, and the second ball and socket joint housing part has a front-side outer contact surface, with which an outer, front-side contact surface of the first ball and socket joint housing part is in contact, a connecting piece being fitted in between the first and second ball and socket joint housing parts such that it is in contact with a first outer surface of the first ball and socket joint housing part and with a second outer surface of the second ball and socket joint housing part as well as with a front-side support surface of the second ball and socket joint housing part, and the connecting piece is stationarily connected to the second ball and socket joint housing part via a connection in substance between the support surface of the connecting piece and the outer surface of the second ball and socket joint housing part.

The ball and socket joint is preferably designed such that the first ball and socket joint housing part has a first outer, front-side support surface, on which lies a first outer support surface of the second ball and socket joint housing part, and a second outer support surface, on which lies a second outer support surface of the second ball and socket joint housing part, and a first outer contact surface, with which an outer contact surface of the second ball and socket joint housing part is in contact, wherein a connecting piece, which is in contact with an outer contact surface with a second outer contact surface of the first ball and socket joint housing part, and the connecting piece is connected to the first ball and socket joint housing part via a connection in substance between an outer surface of the connecting piece, an outer surface of the second ball and socket joint housing part and the second outer contact surface of the first ball and socket joint housing part.

Other measures improving the present invention are described below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 5 is a schematic view of a feeding means feeding a joint housing part and a mounting means for supporting the joint housing part for assembly.

DESCRIPTION OF THE PREFERRED EMBODIMENTS

Figure 1:
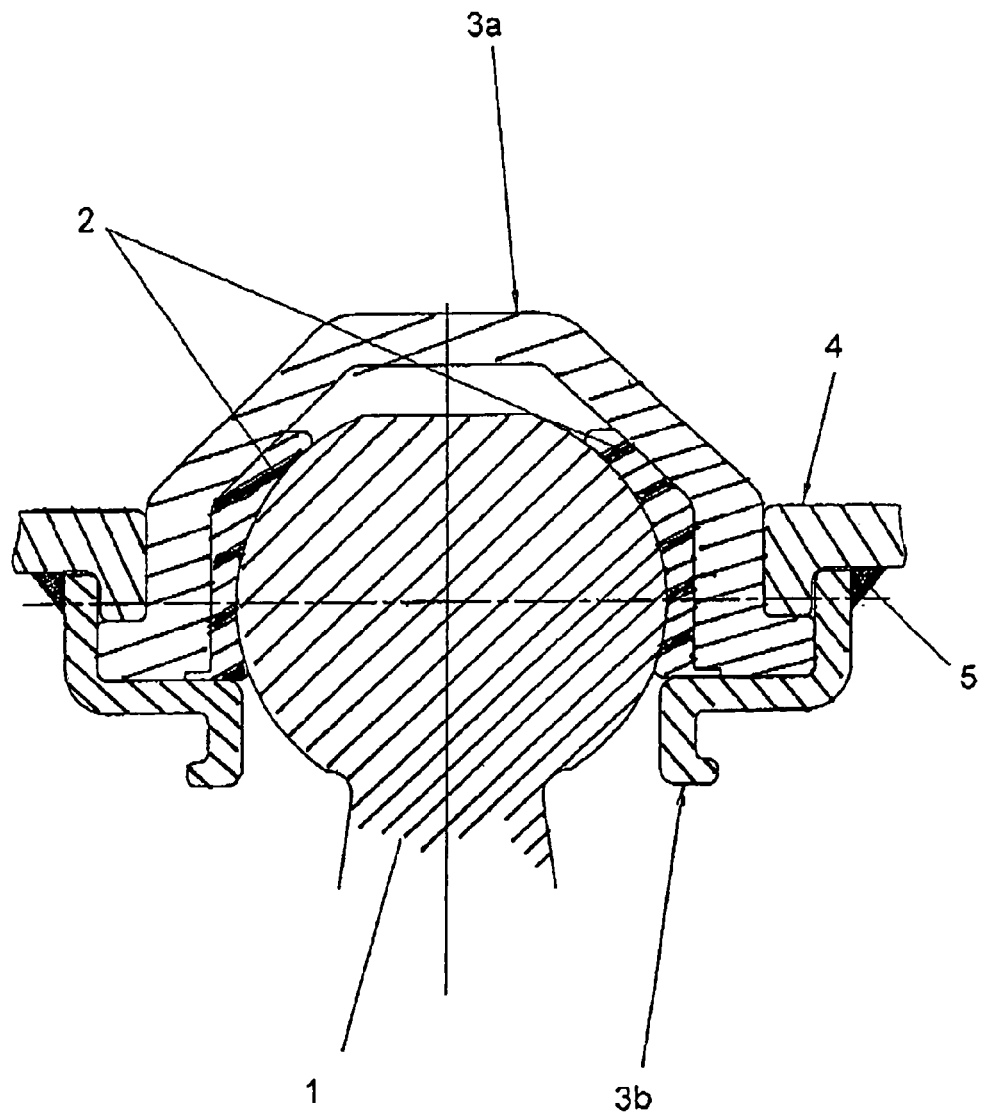
FIG. 1 is a sectional view of a ball and socket joint according to the invention.

Referring to the drawings in particular, the design of a ball and socket joint is schematically shown in FIG. 1. The ball and socket joint comprises a ball pivot 1, which is mounted in a bearing shell 2, which is designed as a one-part or multi-part bearing shell 2. The bearing shell 2 is designed according to this embodiment such that it is mounted in a positive-locking manner between a first and a second ball and socket joint housing parts 3a, 3b. The two ball and socket joint housings 3a, 3b are joined by a connecting piece 4, preferably a suspension arm housing, between the two ball and socket joint housing parts 3a, 3b such that it prevents a horizontal displacement of the two ball and socket joint housing parts 3a, 3b and a vertical displacement of a ball and socket joint housing part 3a. The individual parts 1, 2, 3a, 3b of the ball and socket joint and the connecting piece 4 are designed such that they form a completely manufactured unit after joining in one step, namely, by welding at least one ball and socket joint housing part 3b to the connecting piece 4.

Figure 2:
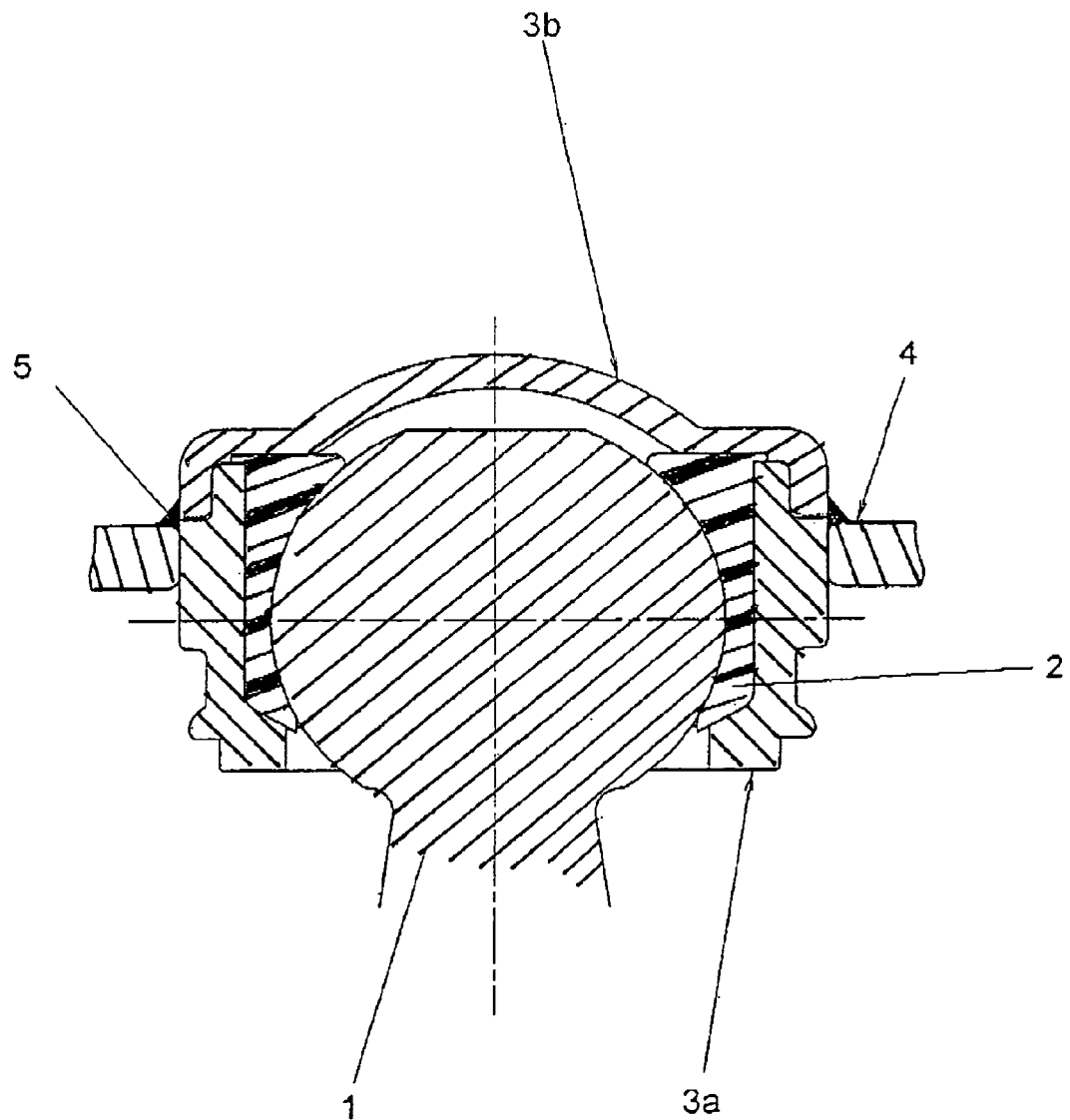
FIG. 2 is a sectional view of an alternative ball and socket joint according to the invention.

FIG. 2 shows an alternative design of the ball and socket joint-suspension arm housing connection. The ball pivot 1 is likewise mounted here in a bearing shell 2, which is designed as a one-part or multipart bearing shell and is arranged in a positive-locking manner between two ball and socket joint housing parts 3a, 3b. However, the ball and socket joint housing parts 3a, 3b and the connecting piece 4 are arranged here such that the three parts can be joined with one another at one point, more precisely, welded. The weld seam 5 prevents a movement of the two housing parts 3a, 3b for this purpose in a direction that is the axial direction relative to the longitudinal axis of the nondeflected ball pivot.

Figure 3:
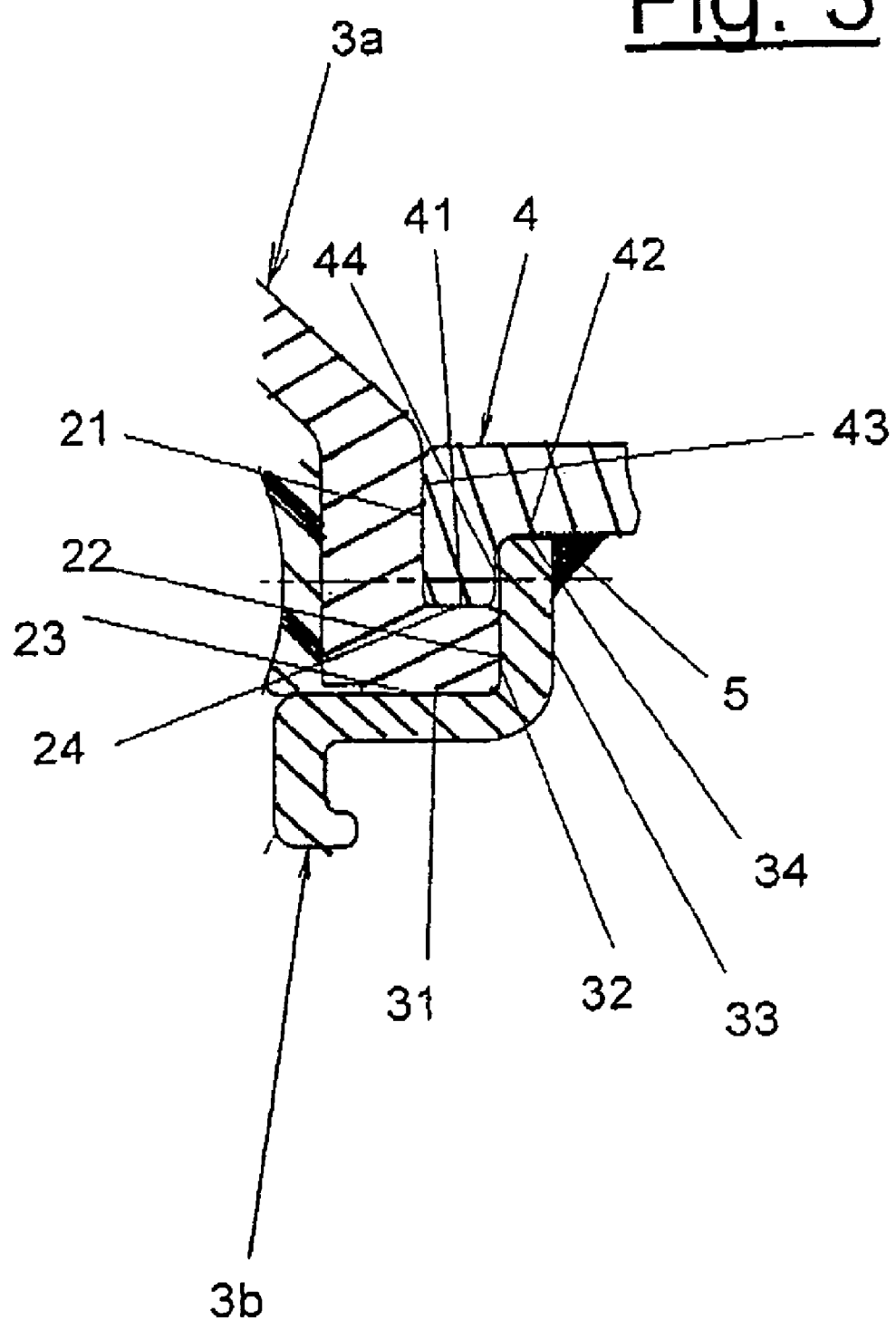
FIG. 3 is a detail view of the ball and socket joint according to FIG. 1.

FIG. 3 shows the contact surfaces of the three parts, namely, the connecting piece 4, the first ball and socket joint housing part 3a and the second ball and socket joint housing part 3b The ends of the individual parts have an essentially L-shaped design and are placed rotated by 90° in relation to one another, so that each part has two contact surfaces with every other part. The surfaces 41 and 43 of the connecting piece 4 touch the surfaces 21 and 24 of the first ball and socket joint housing part 3a. The connecting piece 4 is, furthermore, fitted in between the ball and socket joint housing part 3a and the ball and socket joint housing part 3b such that it touches with its surfaces 42 and 44 the ball and socket joint housing part 3b on the surfaces 32 and 34 thereof. The surfaces 32 and 31 of the second ball and socket joint housing 3b touch the surfaces 22 and 23 of the first ball and socket joint housing 3a. The weld seam 5 connects the three parts, which mutually partly surround each other, at the surface 33 of the second ball and socket joint housing 3b and at the surface 42 of the connecting piece 4 in a stationary manner. Because of the L-shaped design and the rotated arrangement of the parts in relation to one another, the first ball and socket joint housing 3a is inevitably stationarily connected to the second ball and socket joint housing 3b and to the connecting piece 4 with the stationary connection of the second ball and socket joint housing 3b and the connecting piece 4.

Figure 4:
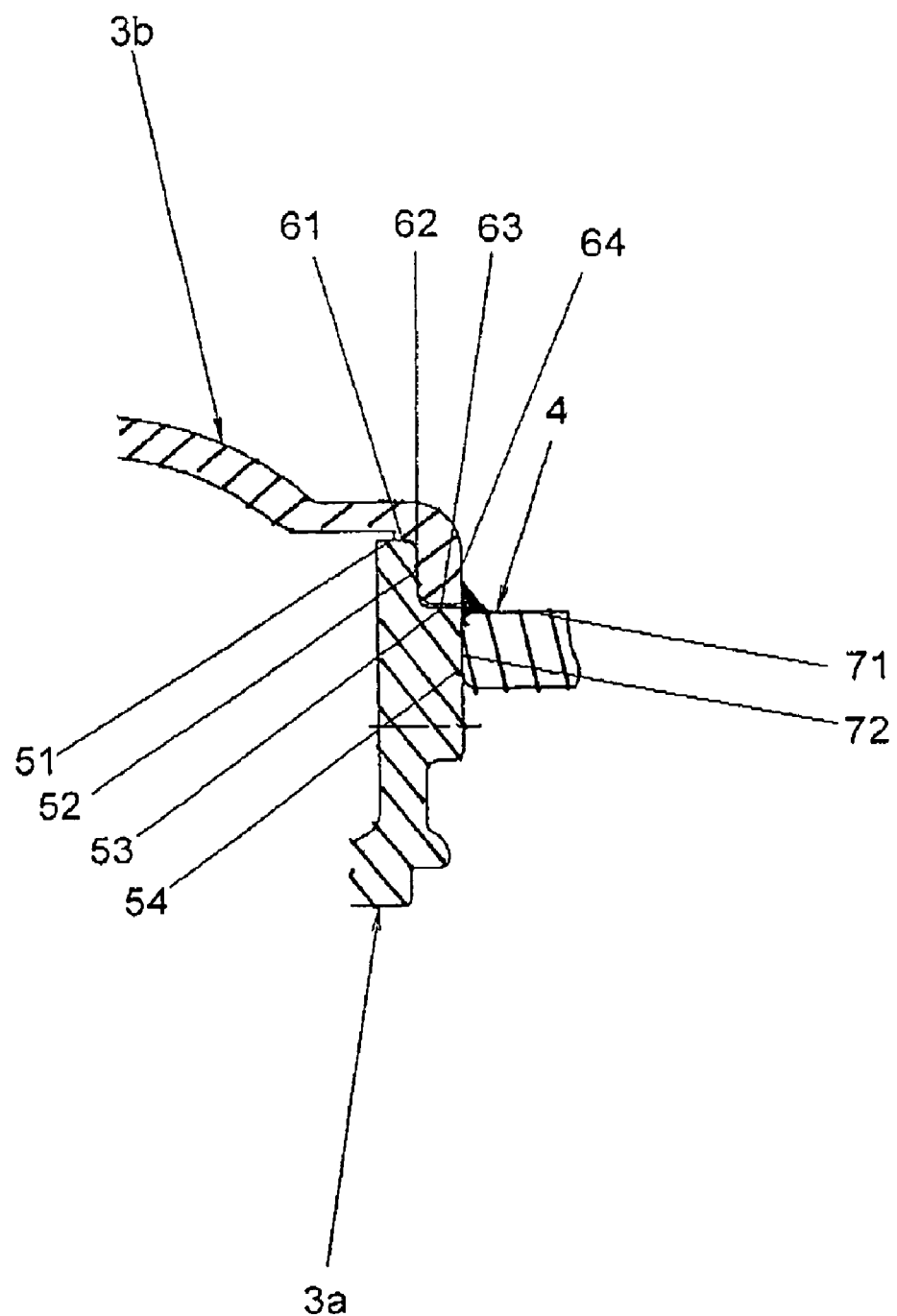
FIG. 4 is a detail view of the ball and socket joint according to FIG. 2.

Analogously to FIG. 3, FIG. 4 shows the contact surfaces of the three parts, namely, the connecting piece 4, and the first and second ball and socket joint housings 3a, 3b. The ends of the two ball and socket joint housing parts 3a, 3b have an essentially L-shaped design. The two ball and socket joint housing parts 3a, 3b are arranged according to the second embodiment such that the respective surfaces 61 and 51, 62 and 52 as well as 63 and 53 of the ball and socket joint housing parts 3a, 3b touch each other. The surfaces 64 and 54 of the two ball and socket joint housing parts 3a, 3b are flush. The connecting piece 4 is laterally butt-jointed with the surfaces 54 and 64 of the ball and socket joint housing parts 3a, 3b. The connecting piece 4 is just barely above or below the parting line between the two ball and socket joint housing parts 3a, 3b. The connecting piece 4 and the two ball and socket joint housing parts 3a, 3b are connected stationarily by means of a connecting element, preferably a weld seam 5. The weld seam 5 is placed such in this case that it covers the parting line of the ball and socket joint housing parts 3a, 3b.

FIG. 5 shows a feed means 80 feeding a first ball and socket joint housing part 3a into a mounting means 82. This arrangement is used so as to insert at least one ball pivot 1 and a bearing shell 2 into the first ball and socket joint housing 3a as well as to feed a second housing part 3b for closing the ball and socket joint. The feed means 80 is designed to feed the connecting piece 4 to the ball and socket joint housing 3a, 3b. At least one joining means 5 is present, which is suitable at least for joining the housing part fed in last with the connecting piece via a corresponding connection.

While specific embodiments of the invention have been shown and described in detail to illustrate the application of the principles of the invention, it will be understood that the invention may be embodied otherwise without departing from such principles.

The invention claimed is:

1. A ball and socket joint comprising:
   a ball pivot;
   a bearing shell;
   a first ball and socket joint housing part;
   a second ball and socket joint housing part, wherein said second ball and socket joint housing part has an outer, front-side support surface, on which lies an outer, front-side support surface of said first ball and socket joint housing part, and said second ball and socket joint housing part has a front-side, outer contact surface, with which an outer, front-side contact surface of said first ball and socket joint housing part is in contact;
   a connecting piece with an annular flange portion wider than the diameter of said ball pivot, attached to either one of said first and second ball and socket joint housing parts after said ball pivot has been clasped between said first and second ball and socket joint housing parts; wherein said connecting piece is fitted in between said first and second ball and socket joint housing parts such that said connecting piece is in contact with said first outer surface of said first ball and socket joint housing part and with said second outer surface of the second ball and socket joint housing part; and
   a connection between said first ball and socket joint housing part, said second ball and socket joint housing part and said connecting piece, said connection holding said first ball and socket joint housing part with said second ball and socket joint housing part and said connecting piece in a positive-locking manner by providing a substance connection on the outer surface of at least one of said first and second ball and socket joint housing parts and said connecting piece or the outer surface of said first ball and socket joint housing part is connected to the outer surface of said second ball and socket joint housing part and to the outer surface of said connecting piece by a connection in substance, wherein said connecting piece is stationarily connected with said second ball and socket joint housing part via said connection in substance between a support surface of the connecting piece and said outer surface of said second ball and socket joint housing part.

2. A ball and socket joint according to claim 1 wherein said first ball and socket joint housing part, said second ball and socket joint housing part and said connecting piece are separate distinctive parts, and said connecting piece is connected in substance with said second ball and socket joint housing part.

3. A ball and socket joint according to claim 1 wherein said first ball and socket joint housing part, said second ball and socket joint housing part and said connecting piece are separate distinctive parts, and said connecting piece and said second ball and socket joint housing part are joined together by a welding, soldering or bonded connection.

4. A ball and socket joint according to claim 1 wherein the ends of said first and second ball and socket joint housing parts and said connecting piece each have an essentially L-shaped design and are placed rotated by 90° in relation to one another, so that each part has two contact surfaces perpendicular to one another with every other part.

5. A ball and socket joint comprising:
   a ball pivot;
   a bearing shell;

a first ball and socket joint housing part;

a second ball and socket joint housing part;

a connecting piece with an annular flange portion wider than the diameter of said ball pivot, attached to either one of said first and second ball and socket joint housing parts after said ball pivot has been clasped between said first and second ball and socket joint housing parts; wherein said connecting piece has an L-shaped cross section defining a shank portion being arranged between said first ball and socket joint housing part and said second ball and socket joint housing part in a radial direction of the ball and socket joint; and a connection between said first ball and socket joint housing part, said second ball and socket joint housing part and said connecting piece, said connection holding said first ball and socket joint housing part with said second ball and socket joint housing part and said connecting piece in a positive-locking manner by providing a substance connection on the outer surface of at least one of said first and second ball and socket joint housing parts and said connecting piece or the outer surface of said first ball and socket joint housing part is connected to the outer surface of said second ball and socket joint housing part and to the outer surface of said connecting piece by a connection in substance, wherein said first ball and socket joint housing part has an another L-shaped cross section defining another shank portion being arranged between said connecting piece and said second ball and socket joint housing part in an axial direction of the ball and socket joint.

6. A ball and socket joint according to claim 5, wherein said first ball and socket joint housing part, said second ball and socket joint housing part and said connecting piece are separate distinctive parts.

7. A ball and socket joint according to claim 6, wherein said connecting piece is connected in substance with said second ball and socket joint housing part.

8. A ball and socket joint according to claim 6, wherein said connecting piece and said second ball and socket joint housing part are joined together by welding.

9. A ball and socket joint according to claim 6, where said bearing shell has a radial outer shoulder being arranged between said first ball and socket joint housing part and said second ball and socket joint housing part in an axial direction of the ball and socket joint.

10. A ball and socket joint comprising:

a ball pivot having a front and a rear portion movable in a forward and a reverse direction along an axis;

a bearing shell provided around said ball pivot;

a first ball and socket joint housing part to accommodate said ball pivot at said front portion with an accommodating means blocking the movement of said ball pivot in said forward direction;

a second ball and socket joint housing part with a pivot hole to be provided at said rear portion, said second ball and socket joint housing part blocking the movement of said ball pivot in said reverse direction, wherein said first ball and socket joint housing part interlocks with said second ball and socket housing part to define an non-obstructing space for a third piece;

a connecting piece with a rim section wider than the diameter of said ball pivot, designed to be assembled after said ball pivot has been clasped between said first and second ball and socket joint housing parts, said connecting piece interfacing with one of said first and second ball and socket joint housing parts to block the movement of said ball pivot in a horizontal direction perpendicular to said axis; and a surface connection among said first ball and socket joint housing part, said second ball and socket joint housing part and said connecting piece, said surface connection holding said first ball and socket joint housing part with said second ball and socket joint housing part and said connecting piece in a positive-locking manner by providing a substance connection on the outer surface of at least one of said first and second ball and socket joint housing parts and said connecting piece or the outer surface of said first ball and socket joint housing part is connected to the outer surface of said second ball and socket joint housing part and to the outer surface of said connecting piece by the connection in substance, wherein said first ball and socket joint housing part includes an L-shaped cross section defining a shank portion directed outwardly via said horizontal direction, said second ball and socket joint housing part includes a flange section designed to receive said L-shaped cross section and define the space as a circular gap with said L-shaped cross section, and said rim section including a protruding annular flange portion designed to fit between said circular gap to provide a tight integration amongst said first and second joint housing parts and said connecting piece.

* * * * *